United States Patent
Zhang et al.

(10) Patent No.: US 9,183,251 B1
(45) Date of Patent: Nov. 10, 2015

(54) SHOWING PROMINENT USERS FOR INFORMATION RETRIEVAL REQUESTS

(71) Applicant: Google Inc., Mountain View, CA (US)

(72) Inventors: Sheng Zhang, Jersey City, NJ (US); John E. Saalweachter, New York, NY (US); Kumar Mayur Thakur, West Orange, NJ (US); Jeremy Hylton, Easton, PA (US); Yihua Wu, Princeton Junction, NJ (US)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 13/723,826

(22) Filed: Dec. 21, 2012

Related U.S. Application Data

(60) Provisional application No. 61/584,689, filed on Jan. 9, 2012.

(51) Int. Cl.
*G06F 7/00* (2006.01)
*G06F 17/30* (2006.01)

(52) U.S. Cl.
CPC .............................. *G06F 17/30424* (2013.01)

(58) Field of Classification Search
None
See application file for complete search history.

(56) References Cited

U.S. PATENT DOCUMENTS

| | | |
|---|---|---|
| 6,891,939 B1 | 5/2005 | Urban et al. |
| 7,580,938 B1 | 8/2009 | Pai et al. |
| 8,484,190 B1 | 7/2013 | Igarashi et al. |
| 8,661,015 B2 | 2/2014 | Karan |
| 8,676,792 B1 | 3/2014 | Scatamacchia et al. |
| 8,688,667 B1 | 4/2014 | Kurzion et al. |
| 2003/0026413 A1 | 2/2003 | Brandt et al. |
| 2007/0036146 A1 | 2/2007 | Adkins et al. |
| 2008/0065237 A1 | 3/2008 | Long |
| 2010/0042619 A1 | 2/2010 | Jones et al. |
| 2010/0070554 A1* | 3/2010 | Richardson et al. .......... 709/202 |
| 2011/0276507 A1 | 11/2011 | O'Malley |
| 2011/0302117 A1 | 12/2011 | Pinckney et al. |
| 2011/0320423 A1* | 12/2011 | Gemmell et al. ............. 707/706 |
| 2011/0320458 A1 | 12/2011 | Karana |
| 2012/0130978 A1 | 5/2012 | Li et al. |
| 2013/0246415 A1* | 9/2013 | Davis et al. ................... 707/732 |
| 2013/0346396 A1 | 12/2013 | Stamm et al. |
| 2014/0019441 A1 | 1/2014 | Shieh et al. |

* cited by examiner

*Primary Examiner* — Robert Beausoliel, Jr.
*Assistant Examiner* — Michael Pham
(74) *Attorney, Agent, or Firm* — Fish & Richardson P.C.

(57) ABSTRACT

Implementations of the present disclosure include actions of receiving authoritative user data, the authoritative user data associating one or more queries with one or more authoritative users, processing the authoritative user data to identify one or more trigger queries, each trigger query including a query that, if received, triggers a display of one or more authoritative users in response, and storing the one or more trigger queries in a trigger queries database, each trigger query being associated with a first set of authoritative users, each authoritative user in the first set of authoritative users being associated with a first score relating to a particular trigger query.

30 Claims, 4 Drawing Sheets

SHOWING PROMINENT USERS FOR INFORMATION RETRIEVAL REQUESTS

CROSS-REFERENCE TO RELATED APPLICATIONS

This application claims the benefit and priority of U.S. Provisional Application No. 61/584,689, filed Jan. 9, 2012, the disclosure of which is expressly incorporated herein by reference in the entirety.

BACKGROUND

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query, the search engine returns a set of search results identifying resources responsive to the query.

SUMMARY

The present disclosure relates to searching.

In general, innovative aspects of the subject matter described in this specification can be embodied in methods including the actions of receiving authoritative user data, the authoritative user data associating one or more queries with one or more authoritative users, processing the authoritative user data to identify one or more trigger queries, each trigger query including a query that, if received, triggers a display of one or more authoritative users in response, and storing the one or more trigger queries in a trigger queries database, each trigger query being associated with a first set of authoritative users, each authoritative user in the first set of authoritative users being associated with a first score relating to a particular trigger query. Other implementations of this aspect include corresponding systems, apparatus, and computer programs, configured to perform the actions of the methods, encoded on computer storage devices.

These and other implementations may each optionally include one or more of the following features. For instance, for each query of the one or more queries, the authoritative user data includes a second set of authoritative users, each authoritative user in the second set of authoritative users being associated with a second score; the first set of authoritative users is a subset of the second set of authoritative users; the first score is equal to the second score; processing authoritative user data includes, for each query of the one or more queries: determining a number of authoritative users having a first score that is greater than a threshold score, determining whether the number of authoritative users is greater than a threshold number, and, if the number of authoritative users is greater than a threshold number, including the query as a trigger query in the trigger queries database; processing authoritative user data includes, for each query of the one or more queries: summing first scores of authoritative users associated with the query to provide a combined score, determining whether the combined score is greater than a threshold score, and, if the combined score is greater than the threshold score, including the query as a trigger query in the trigger queries database; actions further include, for each query of the one or more queries, determining the threshold score based on one or more of a popularity of the query as a search query, a popularity of the query in web resources and a type of the query; the type comprises at least one of a generic query and a location; actions further include: providing a set of candidate queries comprising one or more candidate queries, for at least one candidate query in the set of candidate queries, expanding the at least one candidate query to provide one or more expansion queries, and defining an expanded set of candidate queries that includes the one or more candidate queries and the one or more expansion queries, wherein processing the authoritative user data to identify one or more trigger queries further includes processing the expanded set of candidate queries; the one or more expansion queries include at least one of a synonymous query, a related query and a connected query relative to the at least one candidate query; and actions further include: receiving a search query from a searching user, and determining that the search query corresponds to a trigger query and, in response, providing data associated with the first set of authoritative users for potential display to the searching user.

Particular implementations of the subject matter described in this specification can be implemented so as to realize one or more of the following advantages. In some examples, search results are diversified by displaying other users of computer-implemented services. In some examples, display of authoritative users promotes user exploration of topics and connections between users in social networking services.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to including authoritative users in search results. More particularly, implementations of the present disclosure are directed to determining whether a received search query triggers the display of authoritative users. If the received search query triggers the display of authoritative users, authoritative user data that can be associated with the search query is transmitted for display to a searching user. In accordance with implementations of the present disclosure, a trigger query database is provided and includes one or more trigger queries, each trigger query being associated with one or more authoritative users. A search query can be cross-referenced to trigger queries stored in the trigger query database. If the search query matches a trigger query, a set of authoritative users and data associated with the authoritative users can be provided for display to the searching user that submitted the search query. In some examples, an authoritative user is a user of one or more computer-implemented services (e.g., a social networking service) that has been determined to be authoritative (e.g., an expert) on one or more topics that can be associated with one or more queries.

Figure 1:
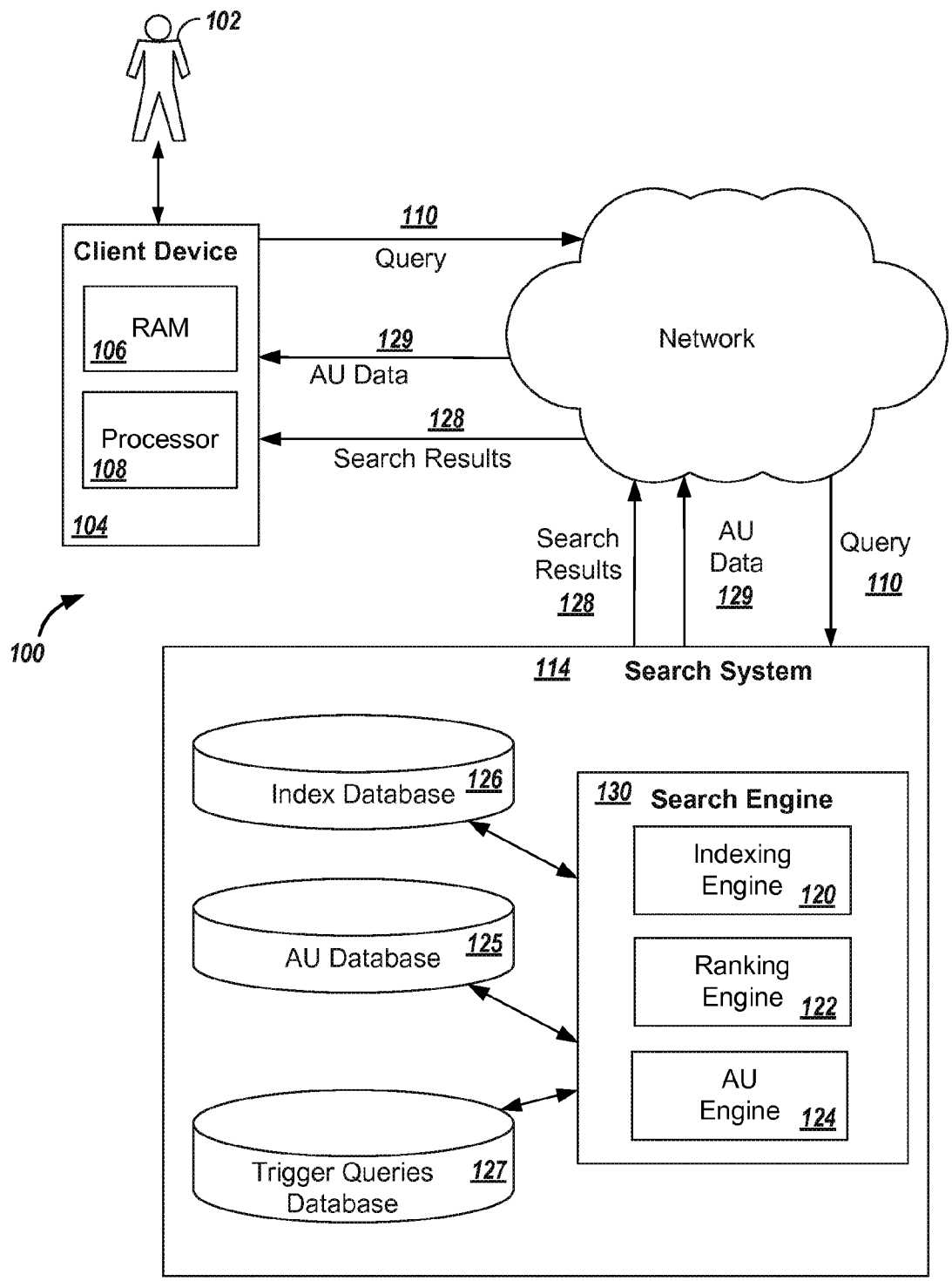
FIG. 1 depicts an example information retrieval system.

FIG. 1 depicts an example information retrieval system 100. The system 100 provides search results relevant to submitted queries as can be implemented in the Internet, an intranet, or another client and server environment. In accordance with the present disclosure, the system 100 also provides authoritative users relevant to the submitted queries. The system 100 is an example of an information retrieval system in which the systems, components, and techniques described below can be implemented.

A user 102 can interact with a search system 114 through a client device 104. For example, the client device 104 can be a computing device coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

The client device 104 can include any type of computing device such as a desktop computer, a tablet computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of any two or more of these data processing devices or other data processing devices. The search system 114 can include one or more server systems.

A user 102 can submit a query 110 to the search system 114. When the user 102 submits a query 110, the query 110 is transmitted through a network to the search system 114. The search system 114 can be implemented as, for example, computer programs running on one or more computers (e.g., servers) in one or more locations that are coupled to each other through a network. In some implementations, the search system 114 includes an authoritative user (AU) database 125, an index database 126, a trigger queries database 127 and a search engine 130. In some examples, the search engine 130 includes an indexing engine 120, a ranking engine 122 and an authoritative user (AU) engine 124. The search system 114 responds to the query 110 by generating search results 128, which are transmitted through the network to the client device 104 in a form that can be presented to the user 102 (e.g., as a search results web page to be displayed in a web browser running on the client device 104). In some implementations, the search system 114 can further respond to the query 110 by identifying one or more authoritative users, and can transfer data 129 associated with the one or more authoritative users through the network to the client device 104 in a form that can be presented to the user 102 (e.g., within the search results web page to be displayed in a web browser running on the client device 104).

When the query 110 is received by the search engine 130, the search engine 130 identifies resources that match, or are responsive to the query 110 and can identify one or more authoritative users responsive to the query 110. In the depicted example, the indexing engine 120 indexes resources (e.g., web pages, images, or news articles on the Internet) found in a collection of content and the index database 126 stores the index information. The ranking engine 122 (or other software) is operable to rank resources that match the query 110, such that search results associated with the results can be displayed in a rank order. The indexing and ranking of the resources can be performed using conventional or other techniques. The authoritative user engine 124 can access the trigger queries database 127 to determine whether one or more authoritative users are to be displayed with the search results. The search system 114 can transmit the search results 128 through the network to the client device 104 for presentation to the user 102. If one or more authoritative users are to be displayed with the search results, the search system 114 can transmit the data 129 associated with the one or more authoritative users through the network to the client device 104 for presentation to the user 102.

In accordance with implementations of the present disclosure, a trigger queries database (e.g., the trigger queries database 127 of FIG. 1) can be provided based on authoritative user data. In some examples, the trigger queries database provides a list of queries that, if received as search queries, triggers the display of one or more authoritative users. In some examples, the authoritative user data can be received from an authoritative user database (e.g., the AU database 125 of FIG. 1). In some examples, the authoritative user database can be provided from a service that identifies one or more users as authoritative users relative to one or more queries. In some implementations, the authoritative user data includes query (Q) data, authoritative user (AU) data and score (S) data that has been determined from one or more social networking services. In some examples, an authoritative user is authoritative for one or more queries with the score providing a relative measure of the authoritativeness of authoritative user for a particular query. For example, a first user and a second user can be determined to be authoritative users for a query, and a first score and a second score can be respectively associated with the first and second users for the query. The first score can exceed, e.g., be greater than, the second score or a threshold, indicating that the first user is deemed to be more authoritative on topics underlying the query than the second user or an authoritative user in general, respectively. In some examples, the authoritative user data is organized in triples (e.g., (Q, AU, S)), where each triple denotes that user AU is authoritative for query Q with the score S.

In some implementations, the trigger query database is generated in phases. Examples phases include a candidate identification phase, a candidate expansion phase, a scoring phase and a trigger query identification phase. In some examples, queries can be associated with or can be representative of one or more topics. Implementations of each example phase are discussed in further detail below.

In implementations of the candidate generation phase, an initial set of candidate queries is defined. The initial set of candidate queries can include a plurality of candidate queries that have been submitted as search queries to a computer-implemented search service. In some examples, candidate queries can be extracted from one or more search logs and can populate the initial set of candidate queries.

In some implementations, candidate queries can be generated from the given authoritative users by considering the scores of users for each query and using various thresholding schemes. An example scheme can include identifying a query as a candidate query if there are at least k (e.g., k is an integer greater than 0) users with scores exceeding a threshold score.

In some implementations, candidate queries can be selected from the one or more search logs based on respective popularities. In some examples, the popularity of a query can be provided as a popularity score. In some examples, the popularity score is determined based on a frequency that the query is submitted as a search query for a given time period. In some examples, the frequency can be compared to a frequency threshold. If the frequency exceeds the frequency threshold, the query can be determined to be a popular query and the popularity score can be set to a first value (e.g., 1). If the frequency does not exceed the frequency threshold, the query can be determined to not be a popular query and the popularity score can be set to a second value (e.g., 0). By way of non-limiting example, a search log can provide data indicating that a first search query ($SQ_1$) has been submitted has a search query X number of times (e.g., within a given time period) and that a second search query ($SQ_2$) has been submitted has a search query Y number of times (e.g., within the given time period). Both X and Y can be provided as a frequency and can be compared to a threshold frequency. In this example, X exceeds the threshold frequency and Y is less than the threshold frequency. Consequently, $SQ_1$ is included in an initial set of candidate queries and $SQ_2$ is not included in the initial set of candidate queries.

In implementations of the candidate expansion phase, candidate queries within the initial set of candidate queries are expanded to provide an expanded set of candidate queries. In some examples, a candidate query is expanded to provide expansion queries. In some examples, the expansion queries can be identified as sub-queries of the original candidate query within the expanded set of candidate queries. In some examples, expansion queries include synonymous queries, related queries and/or connected queries, as discussed in further detail below.

In some examples, a candidate query can be expanded by including synonymous queries. By way of non-limiting example, a candidate query can include [ceo] and synonymous queries can include [ceos] and [chief executive officers]. Consequently, the expanded set of candidate queries can include the candidate query [ceo] and the synonymous queries [ceos] and [chief executive officers].

In some examples, a candidate query can be expanded by including queries that are deemed to be related to the candidate query. Continuing with the non-limiting example, the query [business executive] can be determined to be related to the candidate query [ceo]. Consequently, the expanded set of candidate queries can include the query [business executive]. In some examples, related queries can be provided from a database of related queries using the candidate query as an index.

In some examples, a candidate query can be expanded by including queries that are connected to the candidate query. By way of non-limiting example, the candidate query [google] can be connected to the queries [google places] and [google maps]. Consequently, the expanded set of candidate queries can also include the queries [google places] and [google maps]. In some examples, connected queries can be provided from a database of connected queries using the candidate query as an index.

In implementations of the scoring phase, scoring information from the authoritative user data is used to associate a trigger score with each candidate query in the expanded set of candidate queries. In some examples, for each candidate query, it is determined whether the candidate query is provided in the authoritative user data (e.g., whether the authoritative user data includes a tuple, discussed above, associated with the particular candidate query). If the candidate query is not provided in the authoritative user data, the trigger score for the candidate query is set equal to a minimum value (e.g., 0).

If the candidate query is provided in the authoritative user data, associated authoritative user data is received and can include a list of authoritative users associated with the candidate query and their respective scores. The respective scores can be processed to identify the top k authoritative users associated with the candidate query, where k is provided as a positive integer. By way of non-limiting examples, for a candidate query ($Q_1$), eight authoritative users [User A ($AU_A$), User B ($AU_B$), User C ($AU_C$), ..., User H ($AU_H$)] are provided in the authoritative user data. For example, the triples ($Q_1$, $AU_A$, $S_{A,Q1}$), ($Q_1$, $AU_B$, $S_{B,Q1}$), ($Q_1$, $AU_C$, $S_{C,Q1}$), ..., ($Q_1$, $AU_H$, $S_{H,Q1}$) can be included in the authoritative user data, where the scores $S_{A,Q1}$, $S_{B,Q1}$, $S_{C,Q1}$, ..., $S_{H,Q1}$ provide a relative measure of the authoritativeness of the respective users on the candidate query $Q_1$. It can be determined that the top five (i.e., k=5) authoritative users are to be identified based on score. In the non-limiting example, it can be provided that $S_{H,Q1} > S_{B,Q1} > S_{E,Q1} > S_{D,Q1} > S_{C,Q1} > S_{A,Q1} > S_{F,Q1} > S_{G,Q1}$. Consequently, the authoritative users $AU_H$, $AU_B$, $AU_E$, $AU_D$ and $AU_C$ are determined to be the top k authoritative users for the candidate query $Q_1$ and are associated with the candidate query $Q_1$ in the expanded set of candidate queries.

In some examples, it can be determined that a candidate query was provided as an expansion query. If the candidate query was provided as an expansion query, the scores associated with the identified top K authoritative users can be discounted. In some examples, a degree to which the scores are discounted can vary. For example, if the candidate query is a synonym of the original candidate query, a first discount value (e.g., a multiplier that is less than 1) can be applied. If the candidate query is a related query of the original candidate query, a second discount value can be applied and, if the candidate query is a connected query of the original candidate query, a third discount value can be applied. In some examples, the first discount value can be greater than the second discount value, and the second discount value can be greater than the third discount value.

Using the non-limiting example above, it is determined that the authoritative users $AU_H$, $AU_B$, $AU_E$, $AU_D$ and $AU_C$ are the top k authoritative users for the candidate query $Q_1$ and are associated with the candidate query $Q_1$ in the expanded set of candidate queries. It can also be determined that Q1 is an expansion query of an original candidate query. Consequently, the scores $S_{H,Q1}$, $S_{B,Q1}$, $S_{E,Q1}$, $S_{D,Q1}$ and $S_{C,Q1}$ can be discounted (e.g., by applying a multiplier that is less than 1) to provide respective discounted scores that are associated with the authoritative users in the expanded set of candidate queries.

In implementations of the trigger query identification phase, for each candidate query in the expanded set of candidate queries, it is determined whether the candidate query is to be provided as a trigger query. A trigger query includes a query that, if received as a search query, will trigger the display of one or more authoritative users with the search results. In some examples, if a candidate query is determined to be a trigger query, the candidate query and authoritative user data associated with the candidate query are stored in a trigger query database (e.g., the trigger queries database 127 of FIG. 1).

In some implementations, a set of threshold scores can be applied to all candidate queries and the set of authoritative users associate with those queries. By way of non-limiting example, expanded query sets can be provided as:

$$Q_1 \rightarrow [(AU_A, S_{A,Q1}), (AU_B, S_{B,Q1}), (AU_C, S_{C,Q1})]$$

$$Q_2 \rightarrow [(AU_A, S_{A,Q2}), (AU_B, S_{B,Q2}), (AU_D, S_{D,Q2})]$$

$$Q_3 \rightarrow [(AU_A, S_{A,Q3})]$$

In some examples, threshold scores $\{k, S_{THR}\}$ can be applied to identify a query as a trigger query. For examples, a query is provided as a trigger query in the trigger queries database if there are at least k authoritative users that have a score that exceeds $S_{THR}$. By way of non-limiting examples, if the scores for the query $Q_1$ are provided as 5.0, 4.0 and 1.5, respectively, and if k=2 and $S_{THR}$=3.0, then $Q_1$ is identified as a trigger query and is included in the trigger queries database.

In some implementations, a threshold score can be determined based on one or more of the popularity of the particular candidate query as a search query, the popularity of the candidate query in resources (e.g., web pages) and/or the type of query the candidate query is determined to be. In some examples, it can be provided that the more popular a query is, higher trigger scores should be expected. Consequently, if the candidate query is a popular search query (e.g., based on comparing a popularity score of the candidate query to a threshold, as discussed above), the threshold score can be set at a higher value than it would be if the candidate query is not a popular search query.

In some examples, it can be provided that the more often a query is provided in resources (e.g., web pages), higher trigger scores should be expected. Consequently, the threshold score can be set based on the number of times the candidate query appears in resources. In some examples, the number of times a query appears in resources can be provided from an index database (e.g., the index database 126 of FIG. 1). By way of non-limiting example, if the query appears greater than X number of times in resources, a first threshold score can be provided and, if the query appears less than or equal to X number of times in resources, a second threshold score can be provided, the first threshold score being greater than the second threshold score.

In some implementations, the candidate query can be classified as a particular type of query and the threshold score can be determined based on the type. In some examples, certain types of queries (e.g., generic queries) are not generally to be associated with authoritative users. In some examples, generic queries can include generic terms such as [run] and [favorite]. A candidate query can be processed by a classifier to determine whether the candidate query is, for example, a generic query. If it is determined that the candidate query is a generic query, the threshold score can be set at a relatively high value to deter identification of the candidate query as a trigger query. As another example, a candidate query can be processed by a classifier to determine whether the candidate query is a location. If it is determined that the candidate query is a location, the threshold score can be set at a relatively high value to deter identification of the candidate query as a trigger query.

In some implementations, threshold scores can be computed at least partially based on a statistical distribution of scores of all authoritative users for a given query. In some examples, the statistical distribution can be obtained from the authoritative user data provided in the AU database. By way of non-limiting example, a threshold score can be set equal to the score of a user whose score (for the given query) is at least k times larger than the immediately following user for the same query.

Continuing with implementations of the trigger query identification phase, in some implementations, for each query in the expanded set of candidate queries, a trigger score can be determined. In some examples, each trigger score is determined by combining the scores associated with each authoritative user for the query. By way of non-limiting example, the expanded set of candidate queries can include:

$Q_1 \rightarrow [(AU_A, S_{A,Q1}), (AU_B, S_{B,Q1}), (AU_C, S_{C,Q1})]$ $Q_2 \rightarrow [(AU_A, S_{A,Q2}), (AU_B, S_{B,Q2}), (AU_D, S_{D,Q2})]$ $Q_3 \rightarrow [(AU_A, S_{A,Q3})]$ A trigger score $TS_{Q1}$ associated with the query $Q_1$ can be determined as the sum of $S_{A,Q1}$, $S_{B,Q1}$ and $S_{C,Q1}$. A trigger score $TS_{Q2}$ associated with the query $Q_2$ can be determined as the sum of $S_{A,Q2}$, $S_{B,Q2}$ and $S_{D,Q2}$. A trigger score $TS_{Q3}$ associated with the query $Q_3$ can be equal to $S_{A,Q3}$.

Continuing with the non-limiting example above, for each candidate query in the set of candidate queries, a trigger score can be provided as:

$Q_1 \rightarrow TS_{Q1}$ $Q_2 \rightarrow TS_{Q2}$ $Q_3 \rightarrow TS_{AQ3}$

In some examples, for each candidate query, each trigger score or a combination of trigger scores can be compared to one or more threshold scores. If the trigger score or combination of trigger scores exceeds the threshold score, the candidate query is determined to be a trigger query and is added to the trigger queries database, as discussed above.

Figure 2:
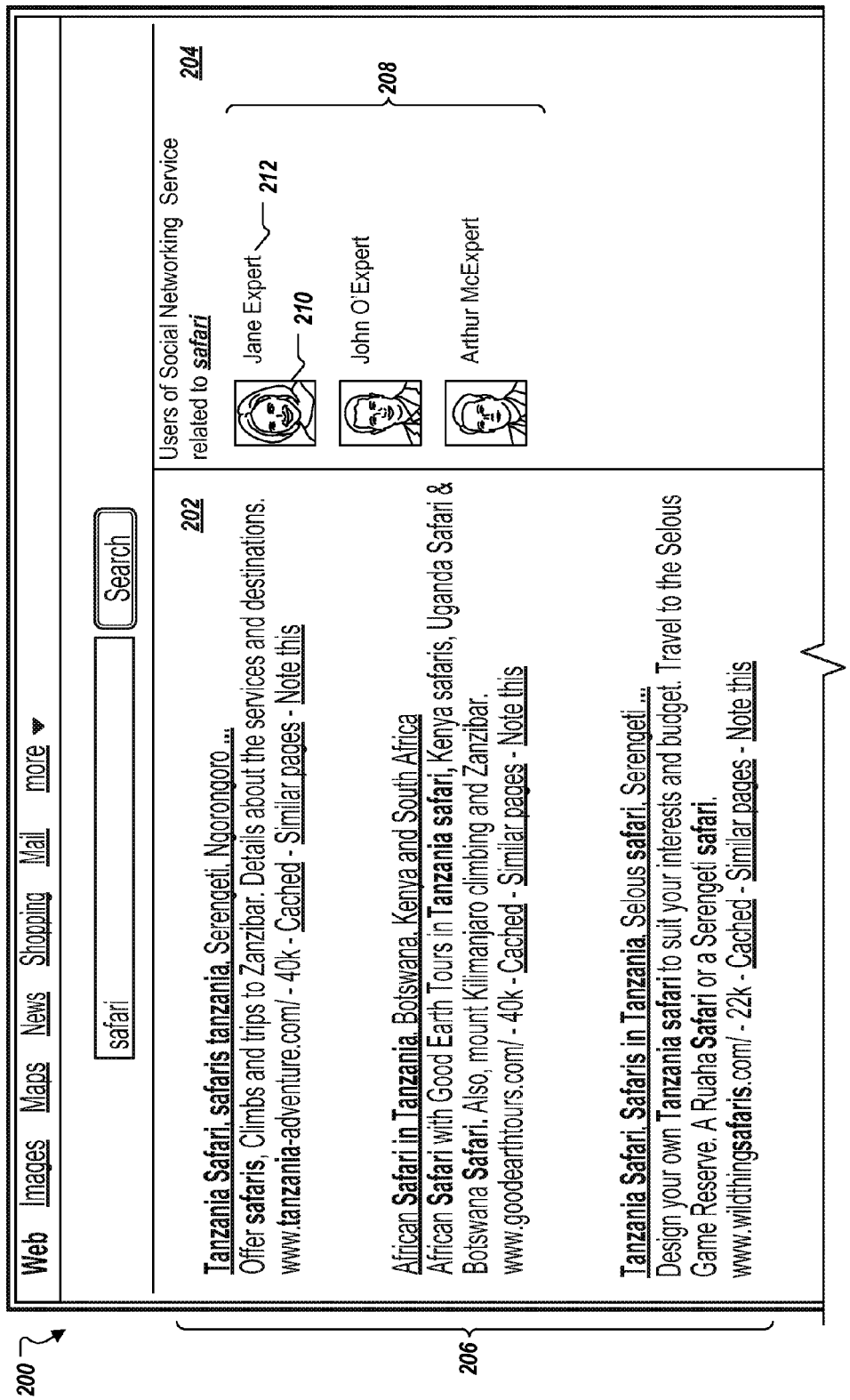
FIG. 2 depicts an example search results page including a search results portion and an authoritative users portion.

FIG. 2 depicts an example search results page 200 including a search results portion 202 and an authoritative users portion 204. The search results page 200 displays example search results in the search results portion 202. The example search results are responsive to the example query "safari." In the depicted example, the displayed search results include web results 206 that are responsive to the example query. It is appreciated, however, that other types of search results (e.g., social search results) can be displayed. In response to the example query, authoritative users 208 are displayed in the authoritative users portion 204. In the depicted example, the authoritative users 208 include "Jane Expert," "John O'Expert" and "Arthur McExpert."

In accordance with implementations of the present disclosure, the example query "safari" of FIG. 2 has been compared to one or more stored trigger queries and has been determined to match, or to be sufficiently similar to a trigger query. Consequently, a set of authoritative users has been defined and includes at least the authoritative users 208 displayed in the authoritative users portion 204.

Figure 3:
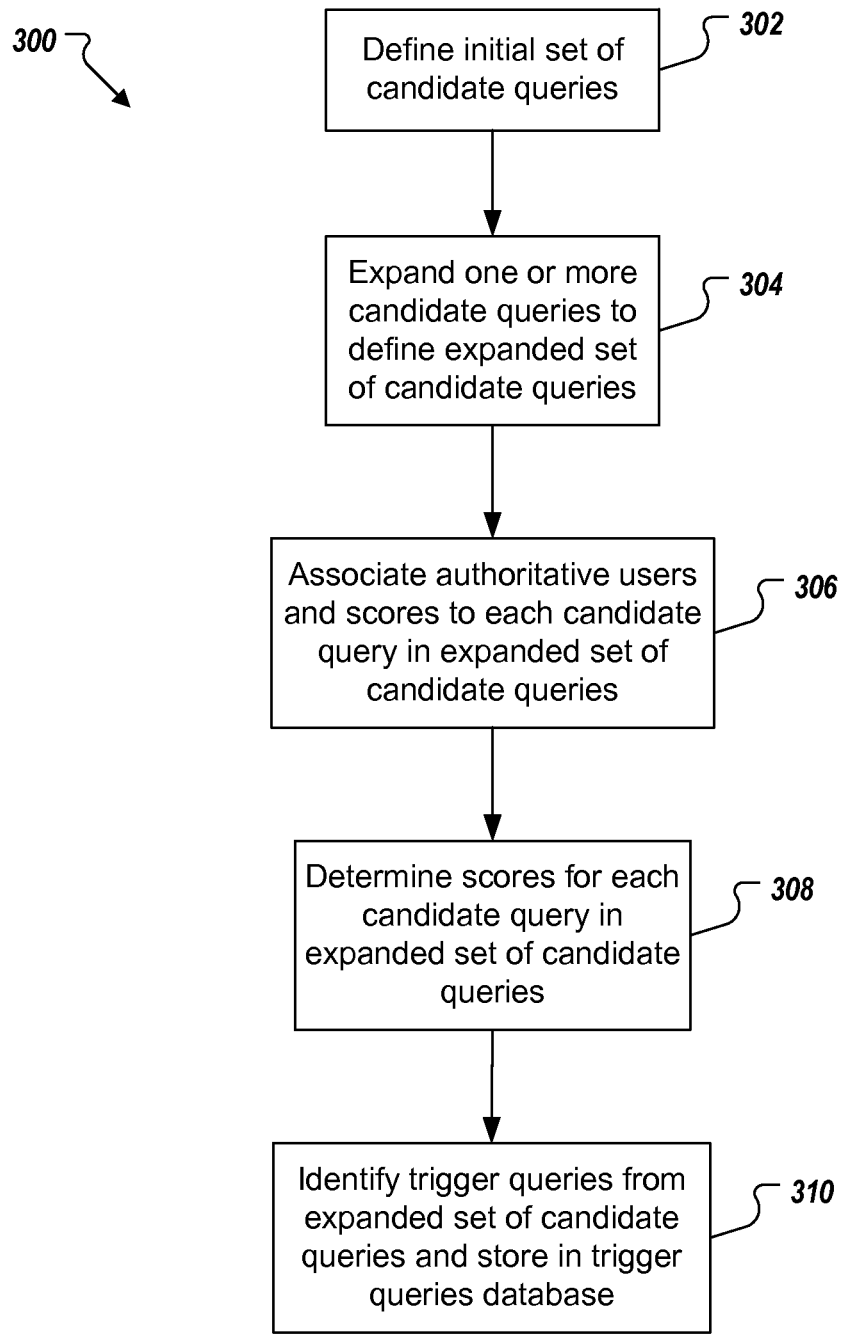
FIG. 3 is a flow diagram of an example process that can be executed in implementations of the present disclosure.

FIG. 3 is a flow diagram of an example process 300 that can be executed in implementations of the present disclosure. In some implementations, the example process 300 can include operations that are performed using one or more computer programs executed using one or more data processing apparatus.

An initial set of candidate queries is defined (302). For example, and as discussed above, the initial set of candidate queries can include a plurality of candidate queries that have been submitted as search queries to a computer-implemented search service, and can be extracted from one or more search logs. One or more candidate queries of the initial set of candidate queries are expanded to define an expanded set of candidate queries (304). For example, and as discussed above, a candidate query can be expanded to provide one or more expansion queries that can include synonymous queries, related queries and/or connected queries. Authoritative users and respective scores are associated with each candidate query in the expanded set of candidate queries (306). For example, authoritative user data can be provided from an authoritative user database for the respective candidate queries and can be associated with candidate queries in the expanded set of candidate queries. Scores are determined for each candidate query in the expanded set of candidate queries (308). In some examples, scores associated with particular candidate queries (e.g., expansion queries) can be discounted before determining the respective trigger scores. Trigger queries are identified from the expanded set of candidate queries and are stored in a trigger queries database (310).

Figure 4:
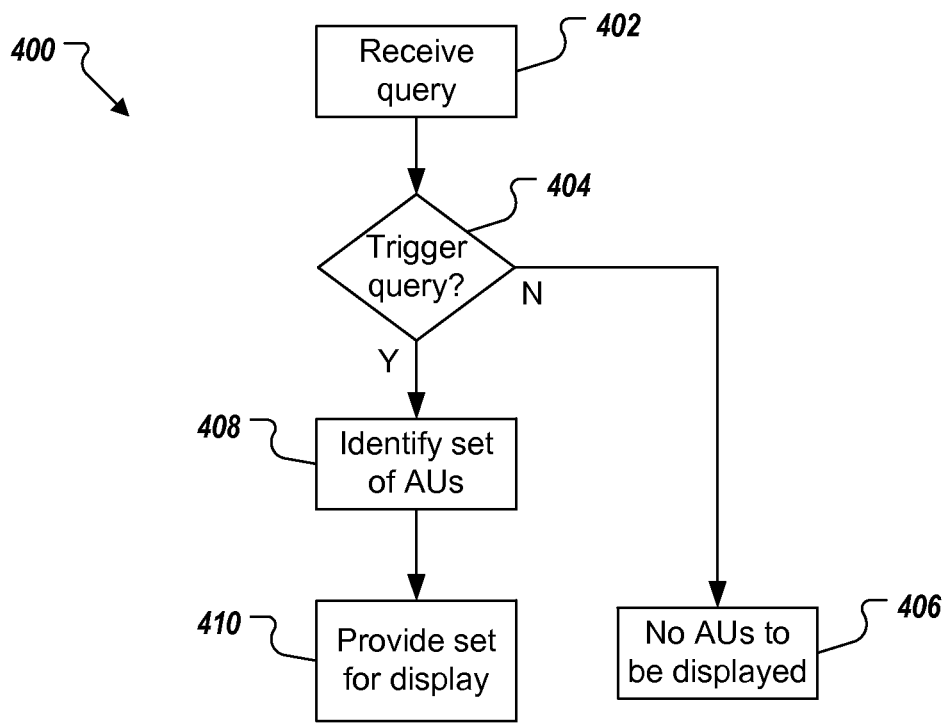
FIG. 4 is a flow diagram of an example process that can be executed in implementations of the present disclosure.

FIG. 4 is a flow diagram of an example process 400 that can be executed in implementations of the present disclosure. In some implementations, the example process 400 can include operations that are performed using one or more computer programs executed using one or more data processing apparatus.

A query is received (402). For example, the query can be provided by a searching user that is using a computer-implemented search service. It is determined whether the query is a trigger query (404). If the query is not a trigger query, no authoritative users are to be displayed with search results responsive to the query (406). If the query is a trigger query, a set of authoritative users is identified (408). In some examples, the set of authoritative users include authoritative users that are associated with the trigger query. The set of authoritative users is provided for display with search results responsive to the query (410).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method executed using one or more processors, the method comprising:
    receiving authoritative user data, the authoritative user data associating one or more candidate queries with one or more authoritative users;
    processing, by the one or more processors, the authoritative user data to identify one or more trigger queries, each trigger query comprising a query that, if received, triggers a display of a first set of the one or more authoritative users in response, the processing including:
        for each candidate query of the one or more candidate queries:
            identifying, for each authoritative user of the first set of the one or more authoritative users, a first score for the candidate query associated with the authoritative user,
            identifying a trigger score based on a combination of the one or more of the first scores,
            determining that the trigger score satisfies a threshold score, and in response, identifying the candidate query as a trigger query; and
        storing the one or more trigger queries in a trigger queries database.

2. The method of claim 1, wherein, for each candidate query of the one or more candidate queries, the authoritative user data includes a second set of the one or more authoritative users, each authoritative user in the second set of the one or more authoritative users being associated with a second score.

3. The method of claim 2, wherein the first set of the one or more authoritative users is a subset of the second set of the one or more authoritative users.

4. The method of claim 2, wherein the first score is equal to the second score.

5. The method of claim 1, wherein processing the authoritative user data comprises, for each candidate query of the one or more candidate queries:
    determining a number of authoritative users of the first set of the one or more authoritative users having a first score that is greater than an additional threshold score;
    determining whether the number of authoritative users of the first set of the one or more authoritative users is greater than the additional threshold number; and
    if the number of authoritative users of the first set of the one or more authoritative users is greater than the additional threshold number, including the query as a trigger query in the trigger queries database.

6. The method of claim 1, further comprising, for each candidate query of the one or more candidate queries, determining the threshold score based on one or more of a popularity of the candidate query as a search query, a popularity of the candidate query in web resources and a type of the candidate query.

7. The method of claim 6, wherein the type comprises at least one of a generic query and a location.

8. The method of claim 1, further comprising:
    for at least one candidate query of the one or more candidate queries, expanding the at least one candidate query to provide one or more expansion queries; and
    defining an expanded set of candidate queries that comprises the one or more candidate queries and the one or more expansion queries, wherein processing the authoritative user data to identify the one or more trigger queries further comprises processing the expanded set of candidate queries.

9. The method of claim 8, wherein the one or more expansion queries comprise at least one of a synonymous query, a related query and a connected query relative to the at least one candidate query.

10. The method of claim 1, further comprising:
receiving a search query from a searching user; and
determining that the search query corresponds to a trigger query and, in response, providing data associated with the first set of the one or more authoritative users for potential display to the searching user.

11. A system, comprising:
one or more computers; and
a computer-readable medium coupled to the one or more computers having instructions stored thereon which, when executed by the one or more computers, cause the one or more computers to perform operations comprising:
receiving authoritative user data, the authoritative user data associating one or more candidate queries with one or more authoritative users;
processing the authoritative user data to identify one or more trigger queries, each trigger query comprising a query that, if received, triggers a display of a first set of the one or more authoritative users in response, the processing including:
for each candidate query of the one or more candidate queries:
identifying, for each authoritative user of the first set of the one or more authoritative users, a first score for the candidate query associated with the authoritative user,
identifying a trigger score based on a combination of the one or more of the first scores,
determining that the trigger score satisfies a threshold score, and in response, identifying the candidate query as a trigger query; and
storing the one or more trigger queries in a trigger queries database.

12. The system of claim 11, wherein, for each candidate query of the one or more candidate queries, the authoritative user data includes a second set of the one or more authoritative users, each authoritative user in the second set of the one or more authoritative users being associated with a second score.

13. The system of claim 12, wherein the first set of the one or more authoritative users is a subset of the second set of the one or more authoritative users.

14. The system of claim 12, wherein the first score is equal to the second score.

15. The system of claim 11, wherein processing the authoritative user data comprises, for each candidate query of the one or more candidate queries:
determining a number of authoritative users of the first set of the one or more authoritative users having a first score that is greater than an additional threshold score;
determining whether the number of authoritative users of the first set of the one or more authoritative users is greater than the additional threshold number; and
if the number of authoritative users of the first set of the one or more authoritative users is greater than the additional threshold number, including the query as a trigger query in the trigger queries database.

16. The system of claim 11, further comprising, for each candidate query of the one or more candidate queries, determining the threshold score based on one or more of a popularity of the candidate query as a search query, a popularity of the candidate query in web resources and a type of the candidate query.

17. The system of claim 16, wherein the type comprises at least one of a generic query and a location.

18. The system of claim 11, wherein operations further comprise:
for at least one candidate query of the one or more candidate queries, expanding the at least one candidate query to provide one or more expansion queries; and
defining an expanded set of candidate queries that comprises the one or more candidate queries and the one or more expansion queries, wherein processing the authoritative user data to identify one or more trigger queries further comprises processing the expanded set of candidate queries.

19. The system of claim 18, wherein the one or more expansion queries comprise at least one of a synonymous query, a related query and a connected query relative to the at least one candidate query.

20. The system of claim 11, wherein operations further comprise:
receiving a search query from a searching user; and
determining that the search query corresponds to a trigger query and, in response, providing data associated with the first set of the one or more authoritative users for potential display to the searching user.

21. A non-transitory computer storage medium encoded with a computer program, the program comprising instructions that when executed by one or more computers cause the one or more computers to perform operations comprising:
receiving authoritative user data, the authoritative user data associating one or more candidate queries with one or more authoritative users;
processing the authoritative user data to identify one or more trigger queries, each trigger query comprising a query that, if received, triggers a display of a first set of the one or more authoritative users in response, the processing including:
for each candidate query of the one or more candidate queries:
identifying, for each authoritative user of the first set of the one or more authoritative users, a first score for the candidate query associated with the authoritative user,
identifying a trigger score based on a combination of the one or more of the first scores,
determining that the trigger score satisfies a threshold score, and in response, identifying the candidate query as a trigger query; and
storing the one or more trigger queries in a trigger queries database.

22. The computer storage medium of claim 21, wherein, for each candidate query of the one or more candidate queries, the authoritative user data includes a second set of the one or more authoritative users, each authoritative user in the second set of the one or more authoritative users being associated with a second score.

23. The computer storage medium of claim 22, wherein the first set of the one or more authoritative users is a subset of the second set of the one or more authoritative users.

24. The computer storage medium of claim 22, wherein the first score is equal to the second score.

25. The computer storage medium of claim 21, wherein processing the authoritative user data comprises, for each candidate query of the one or more candidate queries:

determining a number of authoritative users of the first set of the one or more authoritative users having a first score that is greater than an additional threshold score;

determining whether the number of authoritative users of the first set of the one or more authoritative users is greater than the additional threshold number; and if the number of authoritative users of the first set of the one or more authoritative users is greater than the additional threshold number, including the query as a trigger query in the trigger queries database.

26. The computer storage medium of claim 21, further comprising, for each candidate query of the one or more candidate queries, determining the threshold score based on one or more of a popularity of the candidate query as a search query, a popularity of the candidate query in web resources and a type of the candidate query.

27. The computer storage medium of claim 26, wherein the type comprises at least one of a generic query and a location.

28. The computer storage medium of claim 21, wherein operations further comprise:

for at least one candidate query of the one or more candidate queries, expanding the at least one candidate query to provide one or more expansion queries; and defining an expanded set of candidate queries that comprises the one or more candidate queries and the one or more expansion queries, wherein processing the authoritative user data to identify the one or more trigger queries further comprises processing the expanded set of candidate queries.

29. The computer storage medium of claim 28, wherein the one or more expansion queries comprise at least one of a synonymous query, a related query and a connected query relative to the at least one candidate query.

30. The computer storage medium of claim 21, wherein operations further comprise:

receiving a search query from a searching user; and determining that the search query corresponds to a trigger query and, in response, providing data associated with the first set of the one or more authoritative users for potential display to the searching user.

* * * * *